United States Patent [19]

Colwell et al.

[11] Patent Number: 4,877,984

[45] Date of Patent: Oct. 31, 1989

[54] ELECTRIC MOTOR AND PUMP MOUNTING BRACKET ASSEMBLY AND METHOD OF MAKING

[75] Inventors: Robert A. Colwell; Thomas W. Stone, both of Owosso, Mich.

[73] Assignee: MagneTek Universal Electric, Owosso, Mich.

[21] Appl. No.: 221,138

[22] Filed: Jul. 19, 1988

[51] Int. Cl.⁴ ............................................. H02K 7/00
[52] U.S. Cl. ...................................... 310/66; 310/62; 310/89; 310/91; 310/212; 248/674; 417/360
[58] Field of Search ..................... 310/91, 89, 66, 42, 310/112, 62, 63, 254, 261, 258; 248/300, 647, 674; 417/349, 360, 368

[56] References Cited

U.S. PATENT DOCUMENTS

| | | | |
|---|---|---|---|
| 3,257,956 | 6/1966 | Logue | 417/360 |
| 3,567,973 | 3/1971 | Mastrodonato | 310/42 |
| 3,583,835 | 6/1971 | Coburn, Sr. | 417/360 |
| 3,732,616 | 5/1973 | Masrrodonato | 310/42 |
| 4,492,357 | 1/1985 | Morrill | 248/674 |
| 4,554,472 | 11/1985 | Kumatani | 310/62 |
| 4,689,507 | 8/1987 | Baker | 310/63 |

Primary Examiner—R. Skudy
Attorney, Agent, or Firm—Barnes, Kisselle, Raisch, Choate, Whittemore & Hulbert

[57] ABSTRACT

An electric motor and pump mounting bracket assembly comprising an electric motor and a bracket fastened to the motor for supporting a pump which is driven by the shaft of the electric motor. The electric motor comprises a cylindrical shell which encircles the stator of the motor and a pair of end members engage surfaces on the shell which are accurately positioned longitudinally of the shell relative to one another and relative to the axis of the shell. The end members rotatably support a shaft in concentric relation to the shell. The pump mounting bracket includes a planar surface that is accurately located parallel to and a predetermined accurate distance from the centerline of the shell to form the mounting surface for the pump. The bracket further includes an opening through which the connecting link to the shaft of the motor extends. The accurate surfaces on shell are in predetermined longitudinally spaced relation to the centerline of the opening in the bracket. The assembly further includes an external rotating fan that includes blades which circulate air through the motor for cooling the motor.

10 Claims, 6 Drawing Sheets

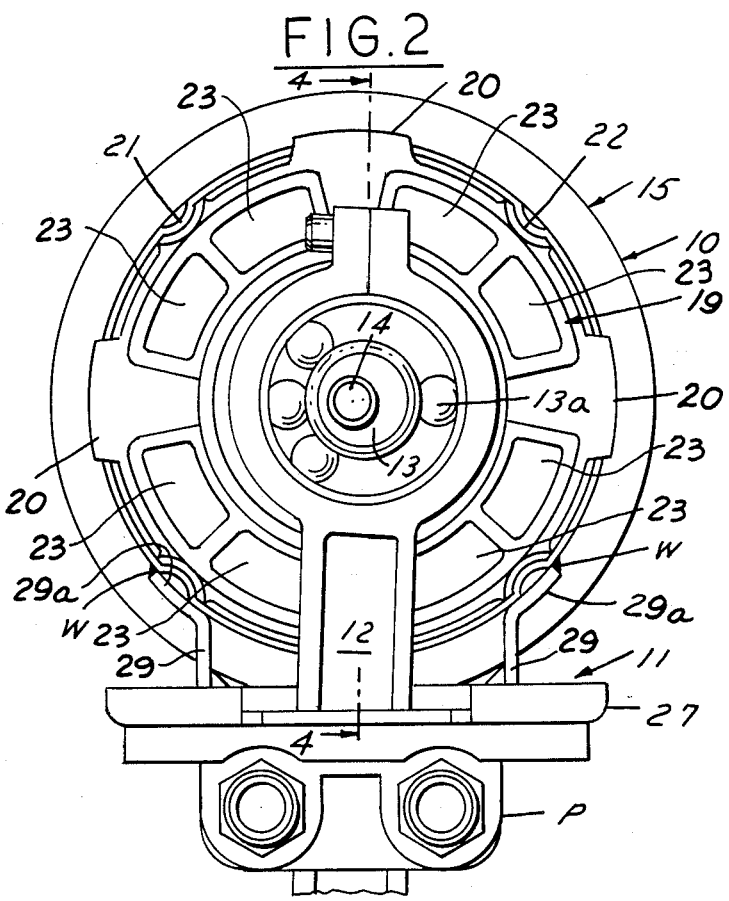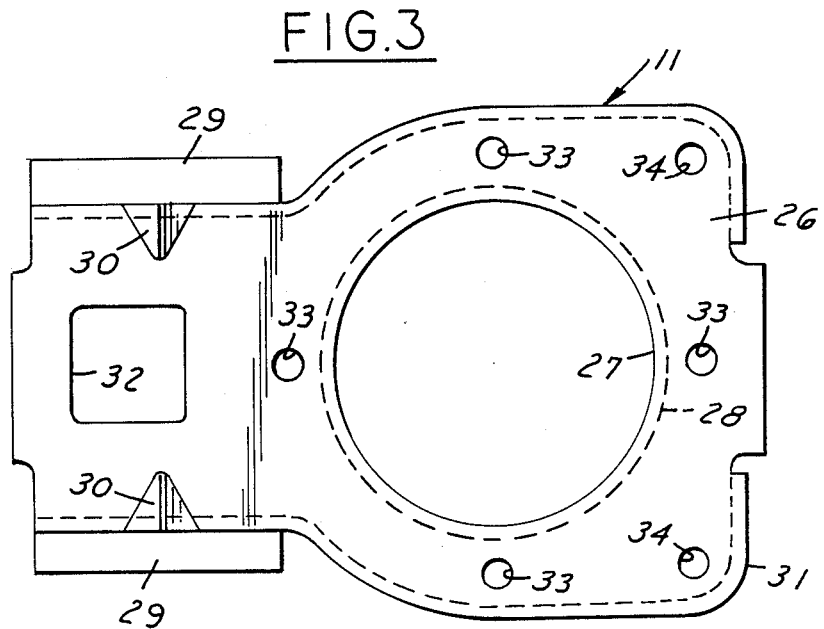

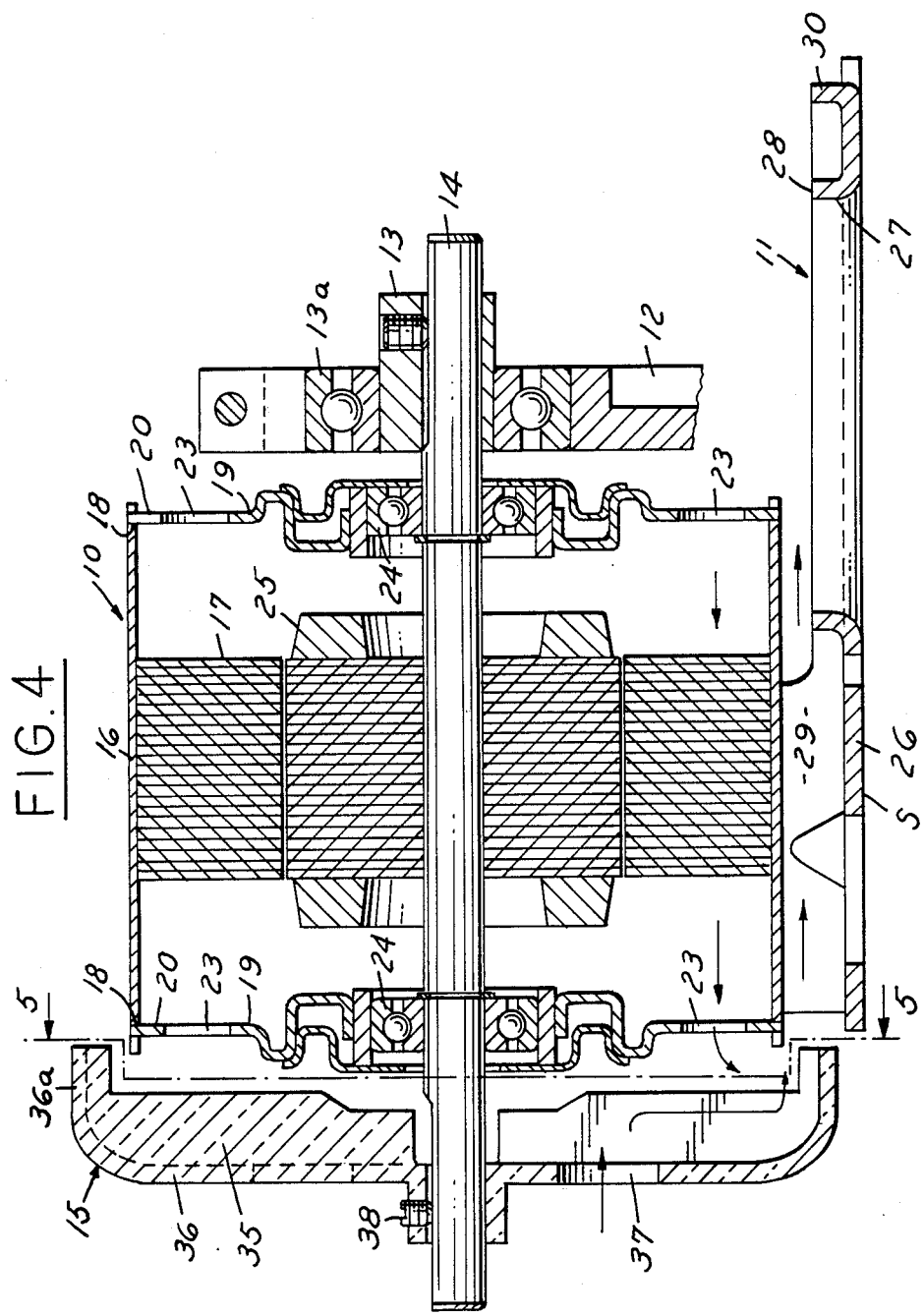

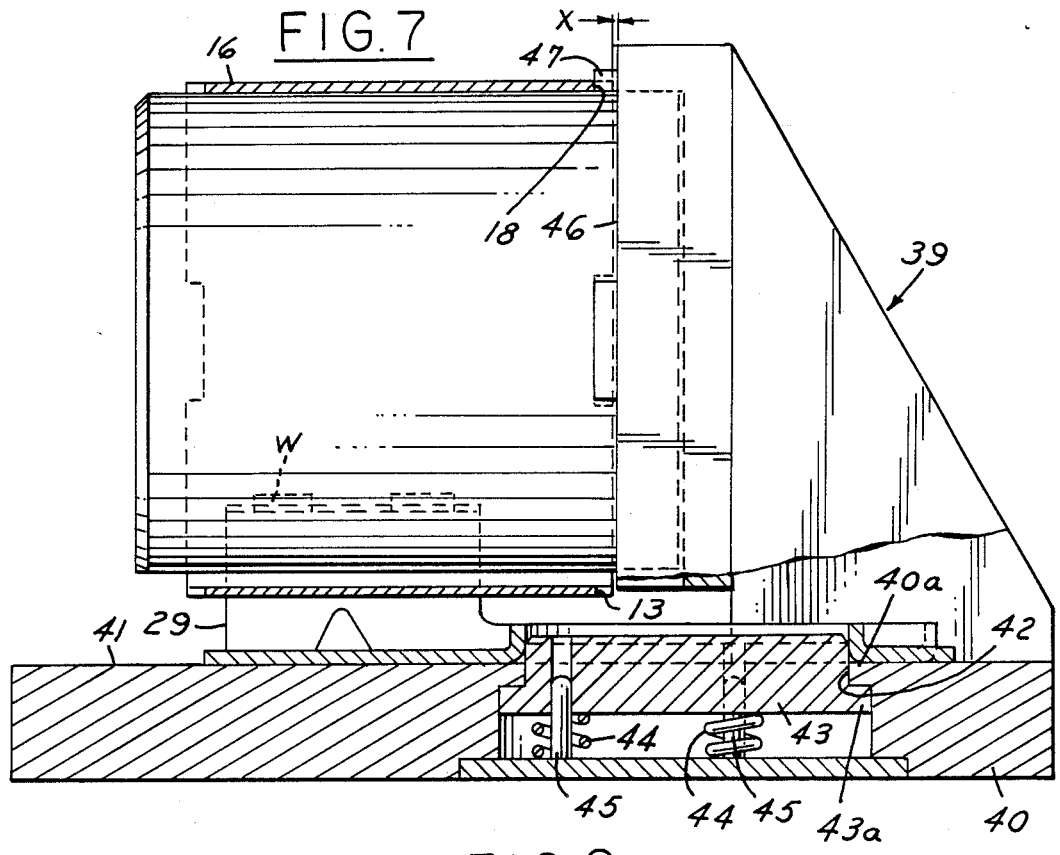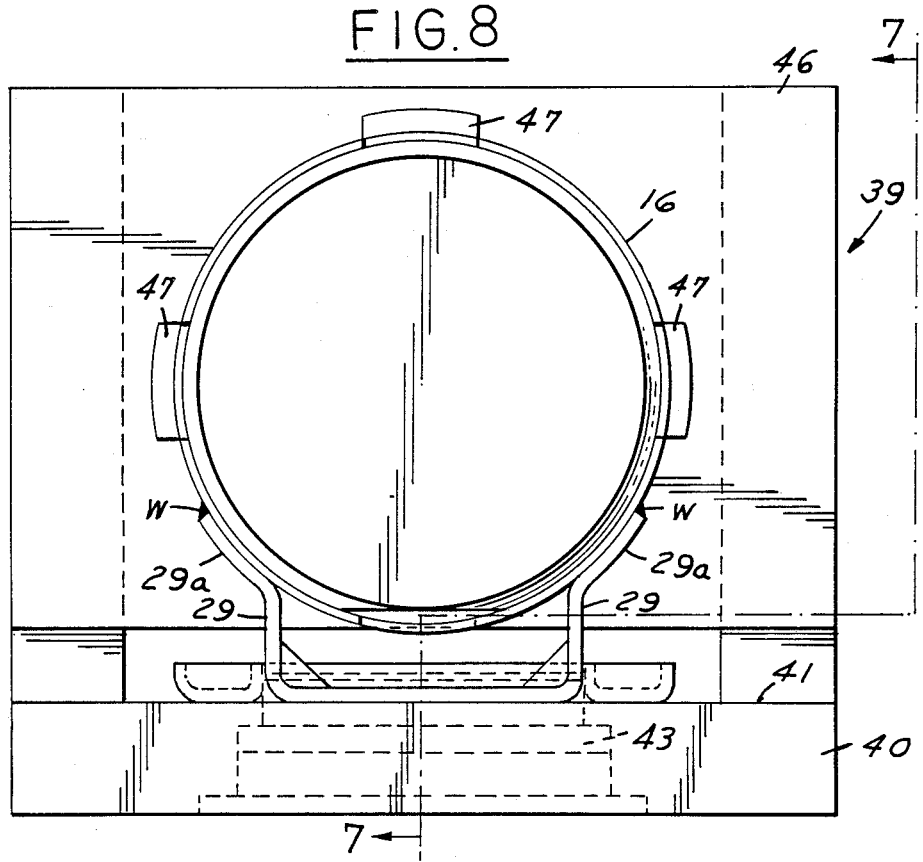

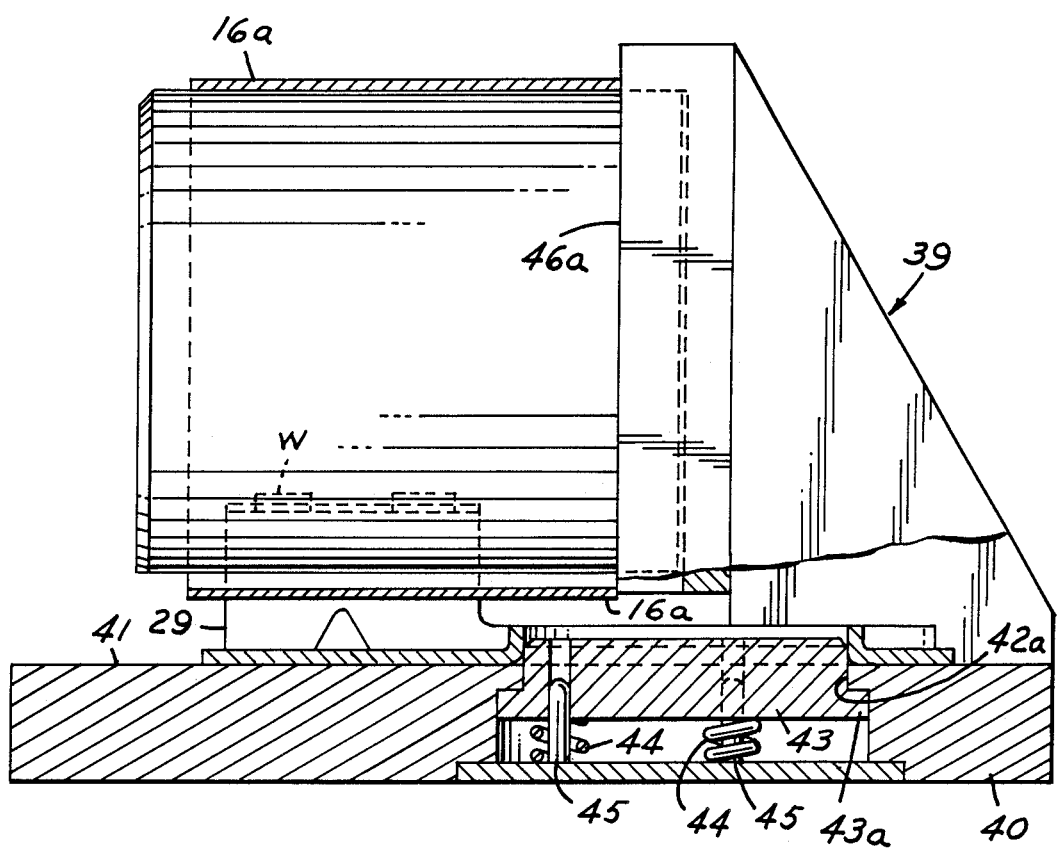

4,877,984

ELECTRIC MOTOR AND PUMP MOUNTING BRACKET ASSEMBLY AND METHOD OF MAKING

This invention relates to motor driven pumps such as are used for pumping air or other gases wherein the pump is connected to the shaft of the motor.

BACKGROUND AND SUMMARY OF THE INVENTION

In one type of motor and pump utilized for pumping air or oxygen, the stator and rotor are mounted in the housing which also defines a cavity for the pump, the latter being of a diagphragm type. Such an arrangement is costly both in the tooling for making the housing and in the complexity and manufacture.

Accordingly, among the objectives of the present invention are to provide an electric motor and pump arrangement that utilizes a low cost bracket on a conventional electric motor yet is accurately formed; which incorporates provisions for cooling the motor as well as the enclosure in which the motor is mounted; which assembly can be made at low cost; and which can be made by relatively simply low cost procedure.

In accordance with the invention, an electric motor and pump mounting bracket assembly comprises an electric motor and a bracket fastened to the motor for supporting a pump which is driven by the shaft of the electric motor. The electric motor comprises a cylindrical shell which encircles the stator of the motor, a pair of end members engage accurate surfaces on the shell which are accurately positioned longitudinally of the shell relative to one another and relative to the axis of the shell. The end members rotatably support a shaft in concentric relation to the shell. The pump mounting bracket includes a planar surface that is accurately located parallel to and a predetermined accurate distance from the centerline of the shell to form the mounting surface for the pump. The bracket further includes an opening through which the connecting link to the shaft of the motor extends. The accurate surfaces on the shell are in predetermined longitudinally spaced relation to the centerline of the opening in the bracket. The assembly further includes an external rotating fan that includes blades which circulate air through the motor for cooling the motor.

DESCRIPTION OF THE DRAWINGS

FIG. 2 is an end view taken from the right in FIG. 1.

FIG. 3 is a plan view of the bracket utilized in the assembly.

FIG. 4 is a sectional view taken along the line 4—4 in FIG. 2 with the pump removed.

FIG. 7 is a fragmentary sectional view taken along the line 7—7 in FIG. 8.

FIG. 8 is an end view of an apparatus utilized in the assembling of the bracket to the shell of the motor.

FIG. 9 is a sectional view similar to FIG. 7 of a modified form of apparatus used for assembly of the bracket to the shell of the rotor.

DESCRIPTION

Figure 1:
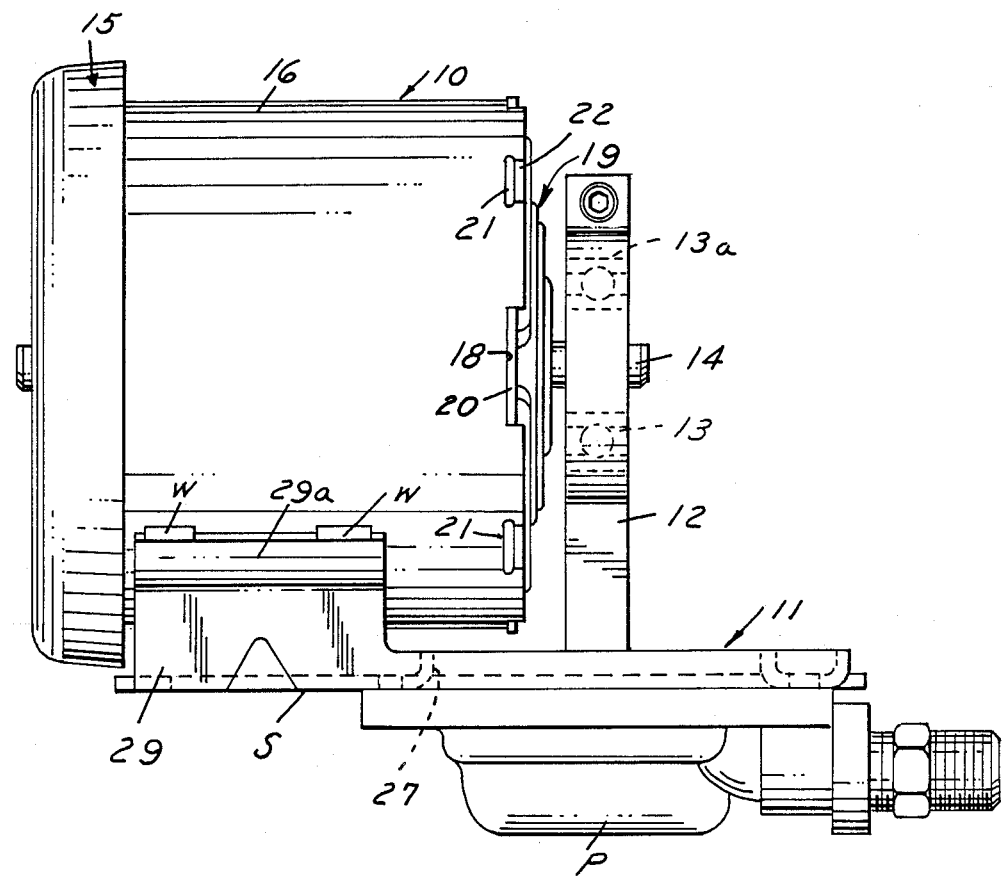
FIG. 1 is a side elevational view of an electric motor and mounting bracket assembly embodying the invention.

Referring to FIG. 1, the assembly embodying the invention comprises an electric motor 10 and a stamped metal bracket 11 supported on the motor 10 in accurate predetermined position, as presently described. The bracket 11 includes a flat surface S that forms the mounting surface for a pump P which is of the diaphragm type. A link 12 connects the diaphragm of the pump to an eccentric 13 on the shaft 14 of the motor. A fan 15 is fixed to the shaft 14 and rotates with the shaft 14 to cool the motor, as presently described.

Referring to FIG. 4, the electric motor is shown as being of the type shown in U.S. Pat. Nos. 3,567,973 and 3,732,616, incorporated herein by reference, and includes a cylindrical shell 16 that supports a stator 17. The shell 16 has a plurality of circumferentially spaced notches in the ends thereof defining radial abutting surfaces 18 which are accurately positioned longitudinally of the shell 16 relative to one another and relative to the axis of the shell 16. End members 19 have radially extending portions 20 engaging the abutting surfaces 18 of the notches and slots 21 define portions 22 that are bent radially inwardly over the end members 19 to hold the end members 19 in position (FIG. 1). The end members 19 are formed with circumferentially spaced openings 23 for the passage of air (FIGS. 1, 4). Bearings 24 in the end members rotatably support the shaft 14 on which a rotor 25 is fixed (FIG. 4).

The pump mounting bracket 11 is made as a stamping and includes a base 26 the underside of which defines the flat surface S for supporting the pump P. Bracket 11 further includes an opening or hole 27 defined by an extruded flange 28 through which the link 12 extends. Bracket 11 further includes upstanding portions 29 the ends 29a of which engage and extend along the outer surface of the shell 16 and are welded thereto by welding material W. In this manner, the centerline of the shell 16 is held in parallel and accurate position with respect to the plane of the surface S and also the centerline of the opening 27 and also in accurate position longitudinally of the shell 16 and particularly of the surfaces 18 of the notches. The bracket 11 further includes a mounting hole 32 and screw holes 33, 34.

Figure 5:
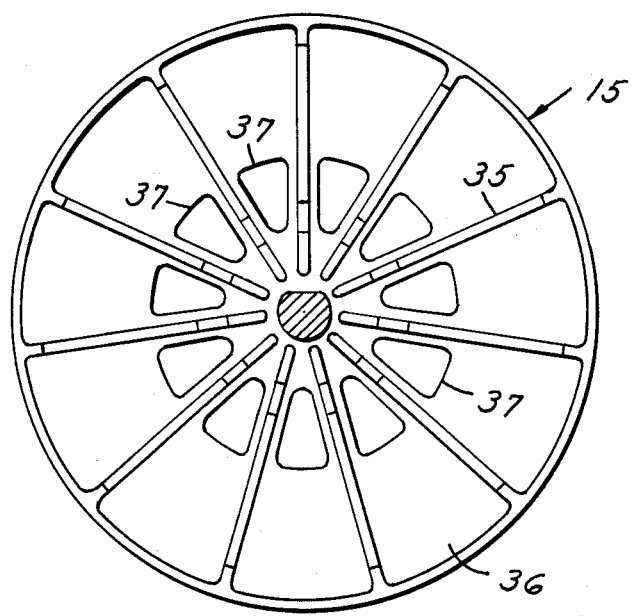
FIG. 5 is an end view of the fan of the assembly.

The fan 15 comprises a plurality of circumferentially spaced radial vanes 35 that extends axially outwardly from a base 36 (FIGS. 4, 5). In addition, the fan includes openings 37.

Referring to FIG. 4 when the electric motor is operated and the fan 15 is rotated, air is drawn through the openings 37 in the fan 15 and air flow is induced axially through the openings 23 in the end members 19 to the periphery of the vanes 35 and outwardly about the periphery of the shell 16 to cool the motor. As shown in FIG. 4, the fan 15 includes an annular axially extending portion or wall 36a that directs the air axially about the shell 16. The arrangement thus provides a dual purpose of cooling the motor and the enclosure in which the motor is provided which is usually made of plastic by moving cool air through the appliance.

Referring to FIGS. 7 and 8, the positioning of the bracket 11 in accurate position with respect to the motor 10 is achieved by use of a jig 39 that includes a base 40 having a flat upper surface 41 onto which the surface S of the bracket 11 is positioned. The jig 39 further includes an opening 42 the axis of which intersects the plane of surface 41. A flanged spring loaded member 43 is mounted in opening and is yieldingly urged upwardly, as viewed in FIG. 7, to locate the bracket 11 longitudinally of the base 40 by having the plunger 43 extend into the opening 27 of the bracket. Member 43 is yieldingly urged upwardly by springs 44 and guided by pins 45. An annular shoulder 40a on the base 40 engages an annular flange 43a to limit the upward movement of member 43.

The jig 39 further includes an upstanding portion 46 that has a mandrel 47 for supporting the shell 16 and a plurality of axially extending circumferentially spaced arcuate lugs 48 for engaging the accurately located surfaces 18 of the notches on the shell 16. The axis of the mandrell is parallel to the surface 41.

In use, bracket 11 is mounted on the base and the shell is positioned on the mandrel 47 with the lugs 48 engaging the bases 18 of the notches of the shell 16. In this manner, the centerline of the shell 16 is supported accurately with respect to the surface S of the jig 39 and the centerline of the opening 27 is located accurately with respect to the bases 18 of the notches. Thereupon, welding material W is provided to fix the wings 29 with respect to the shell thereby locating the shell in the desired position relative to the bracket. It is noted that when the shell 16 is mounted on the jig, a space X is provided between the end of the shell and the jig portion 41 so that full engagement of the ends of the lugs 47 with the bases 18 of the notches is assured.

Although the assembly has been shown and described with reference to end surfaces on the shell, it can be achieved with reference to any other predetermined surface on the shell.

After the bracket has been mounted on the shell, the final assembly of the motor may be completed by adding the stator, rotor, shaft, end members and associated bearings.

Figure 6:
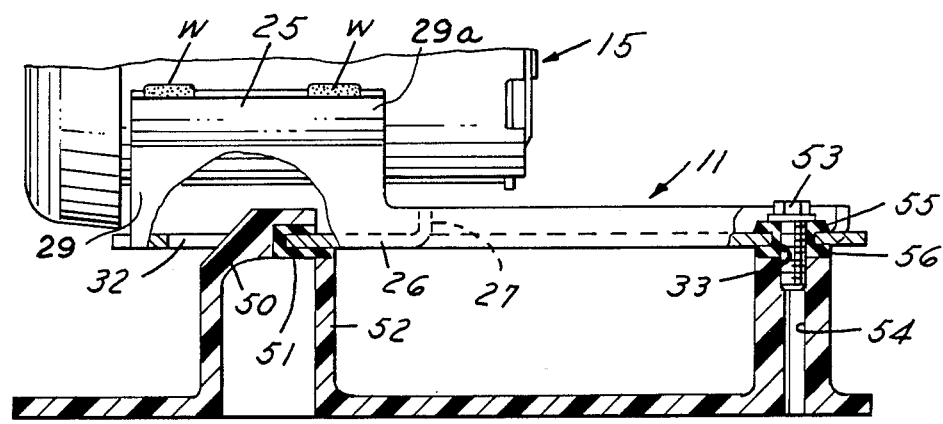
FIG. 6 is a fragmentary sectional view showing the manner in which the pump housing is mounted on the assembly.

Referring to FIG. 6, opening 32 in the bracket 11 is utilized in mounting of the pump housing on the bracket by having a portion 50 of the pump housing extends through the opening 32 into overlying relation with the adjacent wall 26. A gasket 51 having a U-shaped cross section is provided over the edge of the lip of the opening 32 and engages the free end of a wall 52 of the housing of the pump. Thereupon screws 53 are provided through the holes 33 and aligned holes 54 in the housing with gaskets 55, 56 interposed between the screw and the bracket thereby a providing a resilient mount.

Referring to FIG. 9, where the shell of the motor has a single annular end surface 46a abutted by the end members and the end members are held in position by other means such as bolts, the apparatus comprises an accurate surface engaging the surface 46a.

It can thus be seen that there has been provided an electric motor and pump supporting bracket assembly which utilizes a low cost bracket on a conventional electric motor yet is accurately formed; which incorporates provisions for cooling the motor as well as the enclosure in which the motor is mounted; which assembly can be made at low cost; and which can be made by relatively simple low cost procedure.

We claim:

1. An electric motor pump mounting bracket assembly comprising
   an electric motor comprising a stator, a rotor and a shaft on which the rotor is mounted,
   a pump mounting bracket fastened to the motor for supporting a pump which is to be driven by the shaft of the electric motor,
   said electric motor comprising
   a cylindrical shell which encircles the stator of the motor and has a centerline,
   said shell having at least one surface on the shell which is accurately positioned longitudinally of the shell,
   a pair of end members having radial extending portions engaging said surface,
   said end members rotatably supporting said shaft in concentric relation to said shell,
   said pump mounting bracket including a mounting surface that is accurately located parallel to the centerline of the shell and forms the mounting surface for a pump,
   said bracket further including an opening through which a connecting link may extend from a pump to the shaft of the motor,
   said mounting surface on said shell being in predetermined longitudinally spaced relation to the opening in the bracket,
   said bracket including a pair of upstanding portions welded to said shell and supporting said shell with its centerline in accurate relation to said mounting surface.

2. The assembly set forth in claim 1 wherein said mounting surface on said bracket is planar.

3. The assembly set forth in claim 2 wherein said bracket comprises a metal stamping including a body portion defining said planar mounting surface,
   an extruded flange defining said opening,
   said upstanding portions extending from said body portion.

4. The assembly set forth in claim 3 wherein said bracket includes a peripheral flange.

5. The assembly set forth in any of claims 1-4 wherein said surface on said shell comprises a plurality of surfaces formed by the bases of circumferentially based notches at the ends of said shell, said portions of said end members engaging the bases of said notches.

6. The assembly set forth in any of claims 1-4 wherein the surface on said shell comprises a single annular surface on said shell engaged by said end members.

7. The assembly set forth in any of claims 1-4 including a fan mounted on the other end of said shaft and having vanes and axial openings for directing cooling air over and through said motor.

8. The assembly set forth in claim 7 including an eccentric on said one end of said shaft in overlying relation to said opening in said bracket.

9. An electric motor pump mounting bracket assembly comprising
   an electric motor comprising a stator, a rotor and a shaft on which the rotor is mounted,
   a pump mounting bracket fastened to the motor for supporting a pump which is to be driven by the shaft of the electric motor,
   said electric motor comprising
   a cylindrical shell which encircles the stator of the motor and has a centerline,
   said shell having at least one surface on the shell which is accurately positioned longitudinally of the shell,
   a pair of end members having radial extending portions engaging said surface,
   said end members rotatably supporting said shaft in concentric relation to said shell,
   said pump mounting bracket including a mounting surface that is accurately located parallel to the centerline of the shell and forms the mounting surface for a pump, said bracket further including an opening through which a connecting link may extend from a pump to the shaft of the motor, said mounting surface on said shell being in predetermined longitudinally spaced relation to the opening in the bracket, said bracket including a pair of upstanding portions welded to said shell and supporting said shell with its centerline in accurate relation to said mounting surface, said surface on said shell comprises a plurality of surfaces formed by the bases of circumferentially based notches at the ends of said shell, said portions of said end members engaging the bases of said notches, a fan mounted on the other end of said shaft and having vanes and axial openings for directing cooling air over and through said motor.

10. The assembly set forth in claim 9 including an eccentric on said one end of said shaft in overlying relation to said opening in said bracket.

* * * * *